(12) United States Patent
Mangum

(10) Patent No.: US 10,208,995 B2
(45) Date of Patent: *Feb. 19, 2019

(54) FAN MOTOR CONTROLLER FOR USE IN AN AIR CONDITIONING SYSTEM

(71) Applicant: Lennox Industries Inc., Richardson, TX (US)

(72) Inventor: Jeff Mangum, Argyle, TX (US)

(73) Assignee: Lennox Industries Inc., Richardson, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/437,226

(22) Filed: Feb. 20, 2017

(65) Prior Publication Data
US 2017/0159985 A1   Jun. 8, 2017

Related U.S. Application Data

(63) Continuation of application No. 12/861,884, filed on Aug. 24, 2010, now Pat. No. 9,599,383.

(51) Int. Cl.
| | |
|---|---|
| *B23P 19/00* | (2006.01) |
| *F25B 49/02* | (2006.01) |
| *F04D 15/00* | (2006.01) |
| *F04D 15/02* | (2006.01) |

(52) U.S. Cl.
CPC ........... *F25B 49/025* (2013.01); *B23P 19/00* (2013.01); *F04D 15/0066* (2013.01); *F04D 15/0254* (2013.01); *F25B 49/027* (2013.01); *F25B 2600/111* (2013.01); *Y02B 30/743* (2013.01)

(58) Field of Classification Search
CPC ............... F25B 49/025; F04D 15/0254; F04D 15/0066; Y02B 30/743
See application file for complete search history.

(56) References Cited

U.S. PATENT DOCUMENTS

| | | | | |
|---|---|---|---|---|
| 5,528,908 | A * | 6/1996 | Bahel | F25B 13/00 62/81 |
| 2002/0101714 | A1* | 8/2002 | Osecky | G06F 1/206 361/679.48 |
| 2009/0040469 | A1* | 2/2009 | Takeda | G03B 21/16 353/57 |
| 2011/0302937 | A1* | 12/2011 | Bujak, Jr. | F25B 47/02 62/80 |

* cited by examiner

*Primary Examiner* — Ana M Vazquez
(74) *Attorney, Agent, or Firm* — Baker Botts L.L.P.

(57) ABSTRACT

An air conditioning system includes a compressor housing and a motor having fan blades rotatably coupled thereto and located within the compressor housing. The motor has a rotation sensor associated with it that is configured to sense a rotation of the fan blades. The system also includes a controller coupled to the motor that is configured to increase a torque of the motor when the rotation sensor indicates that the fan blades are not rotating after an on-command signal is received by the motor.

20 Claims, 4 Drawing Sheets

FAN MOTOR CONTROLLER FOR USE IN AN AIR CONDITIONING SYSTEM

CROSS REFERENCE TO RELATED INFORMATION

This application is a continuation of U.S. patent application Ser. No. 12/861,884, filed Aug. 24, 2010, titled "Fan Motor Controller for Use in an Air Conditioning System", now U.S. Pat. No. 9,599,383, the contents of which are hereby incorporated herein in its entirety.

TECHNICAL FIELD

This application is directed, in general, to a controller for a fan motor, and more specifically, to fan motor controller for use in an air conditioning system.

BACKGROUND OF THE INVENTION

Air conditioning systems that reside outside a commercial building or residence, such as refrigeration units and heat pumps, are well known. In some applications, these outside units must operate in both warm and cold climate conditions. One such example is a heat pump. A heat pump may be reversibly configured to heat or to cool a climate-controlled space. This dual-role capability may allow the heat pump to replace a separate air conditioner/furnace combination. However, because the heat pump uses electricity for both heating and cooling, efficiency (e.g. HSPF) is of utmost importance. When the unit receives an "on command" from a primary controller, such as a thermostat, located in the commercial building or residence, a motor with fan blades attached thereto is turned on to produce an air flow through the exterior unit.

Under some operating conditions, ice may form between the fan blades and a housing component, thereby blocking fan blade and preventing the fan blade from turning when an "on command" is received. Alternatively, the weight of snow build up on the fan blades may be sufficient to prevent the fan blades from turning. Yet in other instances, a foreign object, such as a tree limb, can become lodge between the fan blades and the housing to prevent fan blade rotation.

In such instances in conventional units, if the motor senses a resistance to the rotation of the fan blades due to one or more of the aforementioned obstacles, the motor will automatically shut down to prevent damage to the motor. When this occurs, the unit is unable to operate normally until the blocking obstacle is removed to free the fan blade. This may require servicing the unit to remove the obstacle, which can be time consuming, costly, and can cause an extended disruption of service.

BRIEF SUMMARY OF THE INVENTION

One aspect provides an air conditioning system, comprising a compressor housing, a motor having fan blades rotatably coupled thereto and located within the compressor housing. The motor has a rotation sensor associated with it that is configured to sense a rotation of the fan blades. This embodiment further comprises a controller coupled to the motor and is configured to increase a torque of the motor when the rotation sensor indicates that the fan blades are not rotating after an on command signal is received by the motor.

Another aspect provides a method of manufacturing an air conditioning system. This method embodiment comprises providing a compressor housing and placing a motor having a fan blades rotatably coupled thereto within the compressor housing. The motor has a rotation sensor associated with it and is configured to sense a rotation of said fan blades. The method further comprises coupling a controller to the motor. The controller is configured to increase a torque of the motor when the rotation sensor indicates that the fan blades are not rotating after an on command signal is received by the motor.

The foregoing has outlined rather broadly the features and technical advantages of the present invention in order that the detailed description of the invention that follows may be better understood. Additional features and advantages of the invention will be described hereinafter which form the subject of the claims of the invention: It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

This disclosure recognizes that ice, snow, or other foreign obstacles blocking the movement of the fan blades of an air conditioning system may be freed by increasing the torque on the motor until the force of the motor frees the fan blades of the blocking obstacle. As used herein "air conditioning system" is meant to have a broad meaning that covers a myriad of apparatus, such as heat pump units and refrigeration units that can be used for refrigeration purposes for cooling the inside of a targeted structure, such as a residence or commercial buildings or refrigeration units for perishable items. When a motor receives an "on command" to turn on and begin rotation and the rotation sensor on the motor senses that rotation has not begun, a controller will send a signal to the motor to steadily increase the torque until the fan blades are freed and are able to turn. The degree of torque that is applied may vary. For example in one instance the torque may be increased up to 40% of the motor's torque capacity before the motor is shut off, while in other instances the torque may be increased up to 100% of the motor's torque capacity before the motor is shut off. This is contrary to conventional motors used in air conditioning systems that immediately shut down when the rotation sensor senses that the blades are not rotating. Because the motor is capable of providing enough torque to typically free the fan blades, the servicing costs and unit down-time associated with conventional systems can be avoided.

The following abbreviations are defined as indicated below in this description:
  ID: Indoor
  OD: Outdoor
  HX: Heat Exchanger
  OAT: Outside Air Temperature
  MRT: Minimum Reset Temperature The following discussion describes various embodiments in the context of heating an indoor ambient, such as a residential living area. Such applications are often referred to in the art as HVAC (heating-ventilating and air conditioning). Heat is described in various embodiments as being extracted from an outdoor ambient. Such references do not limit the scope of the disclosure to use in HVAC applications, nor to residential applications. As will be evident to those skilled in the pertinent art, the principles disclosed may be applied in other contexts with beneficial results, including without limitation mobile and fixed refrigeration applications. For clarity, embodiments in the following discussion may refer to heating a residential living space without loss of generality to other applications as mentioned above.

Figure 1:
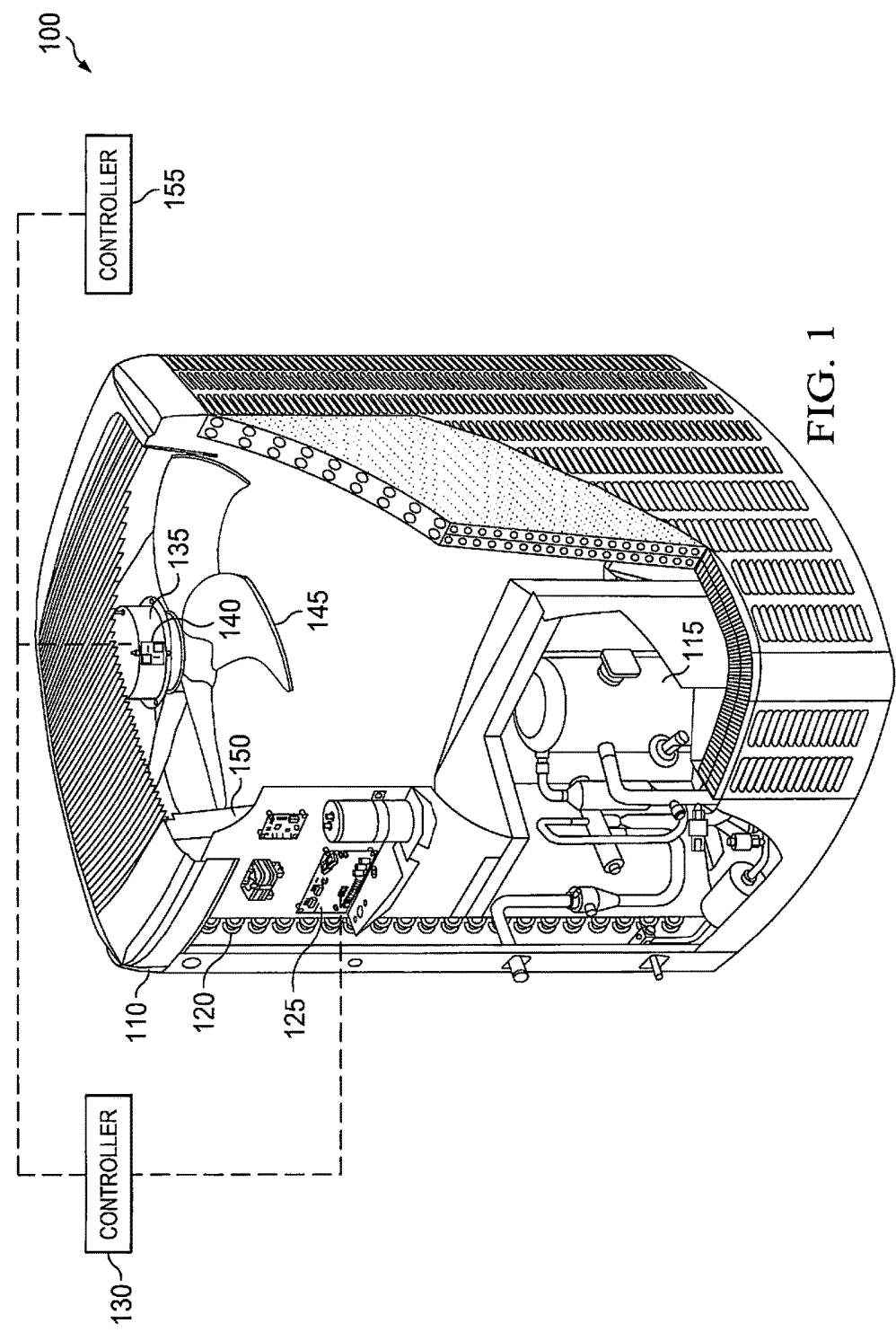
FIG. 1 illustrates an embodiment of an air conditioning unit which may be operated in accordance with the embodiments of this disclosure.

FIG. 1 illustrates a partial cut away view of one embodiment in which the present disclosure may be employed, which in this case, is a heat pump 100. However, it should be understood that the heat pump 100 is presented only as one configuration and that other air conditioning systems, such as refrigeration units for both residential and commercial use are also applicable. In the illustrated embodiment, the heat pump 100 includes a compressor housing 110. Located within the compressor housing 110 is a conventional compressor 115 and associated coils 120 that are fluidly connected with each other and contain the appropriate refrigeration gas. The heat pump 100 may also include control circuitry 125 that is coupled to a remote controller 130, such as a conventional thermostat located on the interior of the structure (not shown). The controller 130 may be coupled to the circuitry 125 by electrical wires, or it may be wirelessly connected to the circuitry 125. In such cases the controller 130 and circuitry 125 will have the appropriate, conventional transmitter/receiver configuration.

The heat pump unit 100 also includes a motor 135. In one embodiment, the motor 135 may be a conventional electronic commutated motor (ECM) that has a rotation sensor associated with it (not shown). That is, the rotation sensor is functionally coupled in some way with the motor to provide a signal regarding the rotation of the fan blades. The rotation sensor which may be mechanical, electrical, or optical in nature, and the ECM may also include a logic circuit control board 140. The board 140 may be programmed to generally control the operation of the motor 135 in a conventional manner. Though an ECM motor is specifically mentioned herein, it should be understood that other types of motors are also within the scope of this disclosure. Attached to the motor 135 are fan blades 145 that are shaped to move air through the heat pump unit 100. In the illustrated embodiment, the housing 110 may also include an orifice ring 150 that is positioned adjacent and about the fan blades 145. The clearance between the fan blades 145 and the orifice ring 150 is relatively small, and as such, ice or freezing snow and easily build up between the two or an obstacle, such as a tree branch may lodge between the two and prevent movement of the fan blades 145 when the motor 135 receives an "on command."

To address this problem, this disclosure provides a controller 155 that is programmed to increase the torque of the motor 135, as discussed below. In one embodiment, the controller 155 may be a part of the programming circuitry of circuitry 140 of the motor 135 or may be a part of the circuitry of controller 130 located in the structure, or it may be part of the circuitry 125. In another embodiment, the controller 155 may be separate from the circuitry 140, controller 130 or circuitry 125 and either be located else where on the motor 135 or the controller 130, or circuitry 125 or be detached from the motor 135, controller 130, or the housing 110 and located distally therefrom. In such instances, the controller 155 may be coupled to the motor 135, the controller 130, or circuitry 125 either by wires, a wireless system (either of which are shown generally by the dashed line) or an optical system, in which case, the motor 135, the controller 155 or the circuitry 125 will both include sufficiently configured conventional transmitters/receivers for wireless or optical communication. In yet another embodiment, the controller 155 may be associated with a conventional optical device that receives a signal from an optical reader that is configured to detect when the fan blades 145 pass through an optical beam, thereby indicating a rotation. If the optical signal is not produced a predetermined time after the "on command" is received by the motor, then the controller 155 would increase the torque of the motor 135 in a prescribed manner until rotation was detected.

Figure 2:
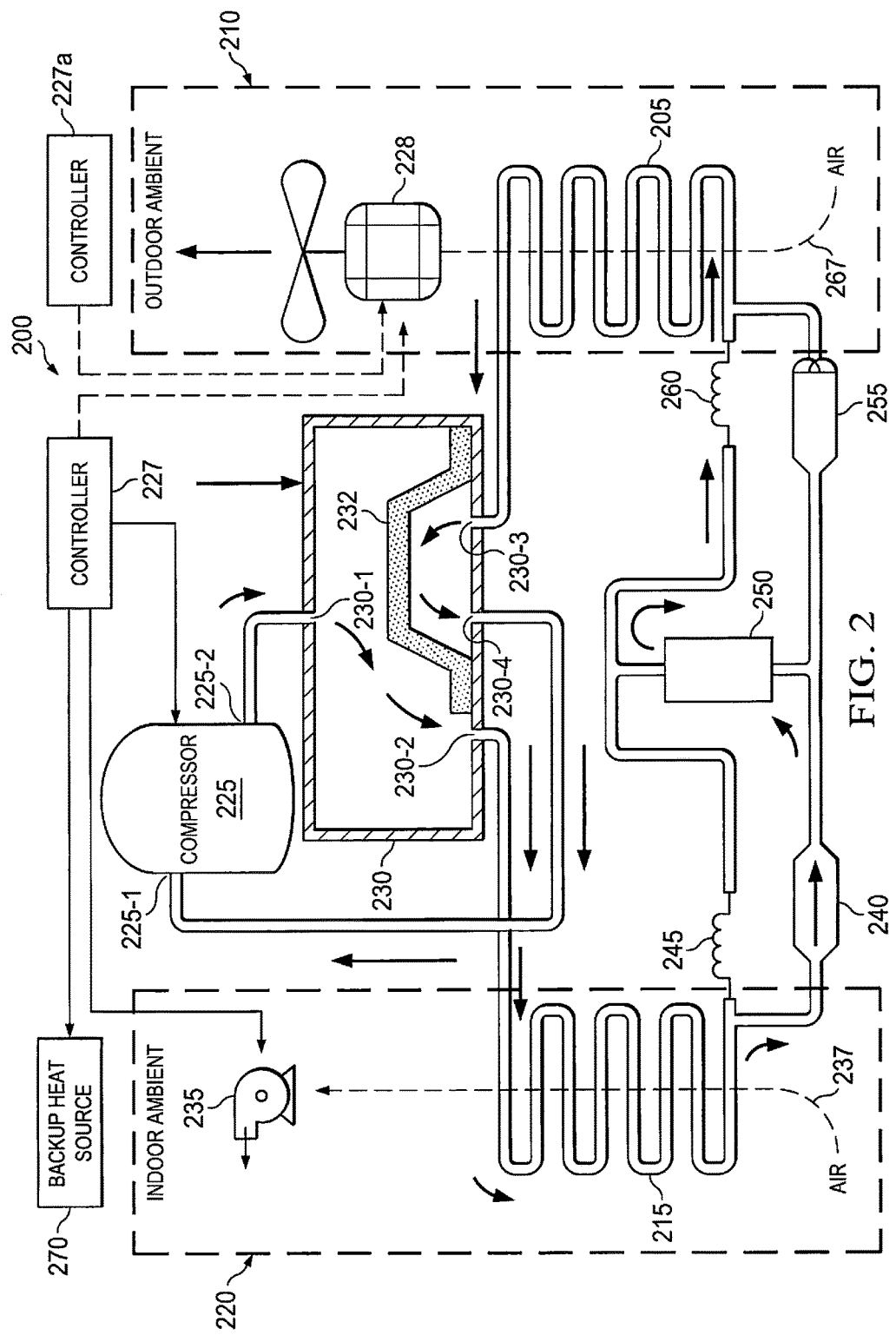
FIG. 2 illustrates a block diagram of a heat pump system of the disclosure operating to transport heat from an outdoor ambient to an indoor ambient and which may be operated in accordance with the embodiments of this disclosure.

FIG. 2 is a block diagram of a heat pump system 200 which is but one air conditioning system in which the controller 155 may be employed. The system 200 may be used in, e.g., residential/commercial HVAC, retail grocery refrigerators (such as those used in grocery stores), refrigerated warehouses, domestic refrigeration and refrigerated transport. The system 200 includes an outdoor (OD) HX coil 205 in an OD ambient 210, and an indoor (ID) HX coil 215 in an ID ambient 220. In the heating mode the OD HX coil 205 acts as an evaporating coil that extracts heat from the OD ambient 210, and the ID HX coil 215 acts as a condensing coil that releases heat to the ID ambient 220. In cooling mode, the roles of the HX coils 205, 215 are reversed.

The system 200 as illustrated is configured to operate in a "pumped heating mode," e.g. to transport heat from the OD HX coil 205 to the ID HX coil 215. Conceptually, in this mode the OD ambient 210 may be viewed as a heat source, and the ID ambient 220 may be viewed as a heat sink. When the system 200 is configured to operate in a "cooling mode," e.g. to transport heat from the ID HX coil 215 to the OD HX coil 205, the ID ambient 220 is the heat source and the OD ambient 210 is the heat sink.

The operation of the system 200 in the configuration of FIG. 2 is now described in the context of the pumped heating mode without limitation to a particular application thereof. A compressor 225 includes an input port 225-1 and an output port 225-2. The compressor 225 and the HX coils 205, 215 form a closed system that includes a refrigerant. The compressor 225 pressurizes the refrigerant, which then flows to a flow valve 230. In the illustrated embodiment, a controller 227 is configured to provide an on command to a fan blade motor 228 and generally control the operation of the components of the system 200, including the compressor 225 when there is a need to provide heat to increase the temperature of the ID ambient 220. However, as explained above with respect to other embodiments, a separate controller 227a, or one integral to the motor 228, may be included within the design to control the motor 228 in the event that the rotation of the fan blades is blocked by an obstacle. The controller 227 may include any combination of electronic, mechanical and electro-mechanical components configured to control the components of the system 200 within the scope of the disclosure, as those mentioned above and further includes microprocessors, microcontrollers, state machines, relays, transistors, power amplifiers and passive electronic devices.

The flow valve 230 is illustrated without limitation as a reversing slide valve. The following description is presented without limitation for the case that the flow valve 230 is a reversing slide valve. While a reversing slide valve may be beneficially used in various embodiments of the disclosure, those of ordinary skill in the pertinent art will appreciate that similar benefit may be obtained by alternate embodiments. Embodiments discussed below expand on this point.

The flow valve 230, consistent with the construction of reversing slide valves, has a sliding portion 232. In an example embodiment, without limitation, the flow valve 230 is a Ranco type V2 valve available from Invensys Controls, Carol Stream, Ill., USA. The flow valve 130 includes four ports 230-1, 230-2, 230-3, and 230-4. The sliding portion 232 is typically located in one of two positions. In a first position, as illustrated in FIG. 2, the ports 232-1 and 232-2 are connected, as are the ports 232-3 and 232-4. In the second position, the ports 232-2 and 232-4 are connected, as are the ports 232-1 and 232-3.

When the compressor 225 receives an on command, refrigerant flows from the compressor 225 to the ID HX coil 215 via the ports 230-1, 230-2. The refrigerant carries an enthalpy ΔHv due to compression, and an enthalpy due to condensation related to the phase change of the refrigerant from gas to liquid. The refrigerant is therefore typically warmer than the ID ambient 220. A blower 235 controlled by the controller 227 moves air 237 over the ID HX coil 215, transferring heat from the refrigerant to the ID ambient 220, thus reducing the temperature of the refrigerant.

The refrigerant flows through a check valve 240 oriented to open in the illustrated direction of flow, causing the refrigerant to bypass a throttle 245. The refrigerant then flows through a filter/drier 250. A check valve 255 is oriented to close in the direction of flow, thus causing the refrigerant to flow through a throttle 260. A portion of the refrigerant vaporizes on the downstream, low pressure side of the throttle 260, thereby cooling according to ΔHv and expansion. The cooling of the refrigerant causes the OD HX coil 205 to cool. The motor 228, which may also be controlled by the controller 227 moves air 267 over the OD HX coil 205, transferring heat from the OD ambient 210 to the refrigerant, unless the fan blades are blocked by an obstacle. In such instances, a logic program, as described below, associated with controller 227 or 227a will be engaged to free the fan blades. The refrigerant returns to the compressor 225 via the ports 230-3, 230-4 of the flow valve 230, thus completing the refrigeration cycle. This is in contrast to conventional operating parameters that will typically shut down the motor to prevent or minimize damage to the motor 228.

The system 200 may also include an optional backup heat source 270, also controlled by the controller 227. The backup heat source 270 may be conventional or novel, and may be powered by electricity, natural gas, or any other fuel.

Figure 3:
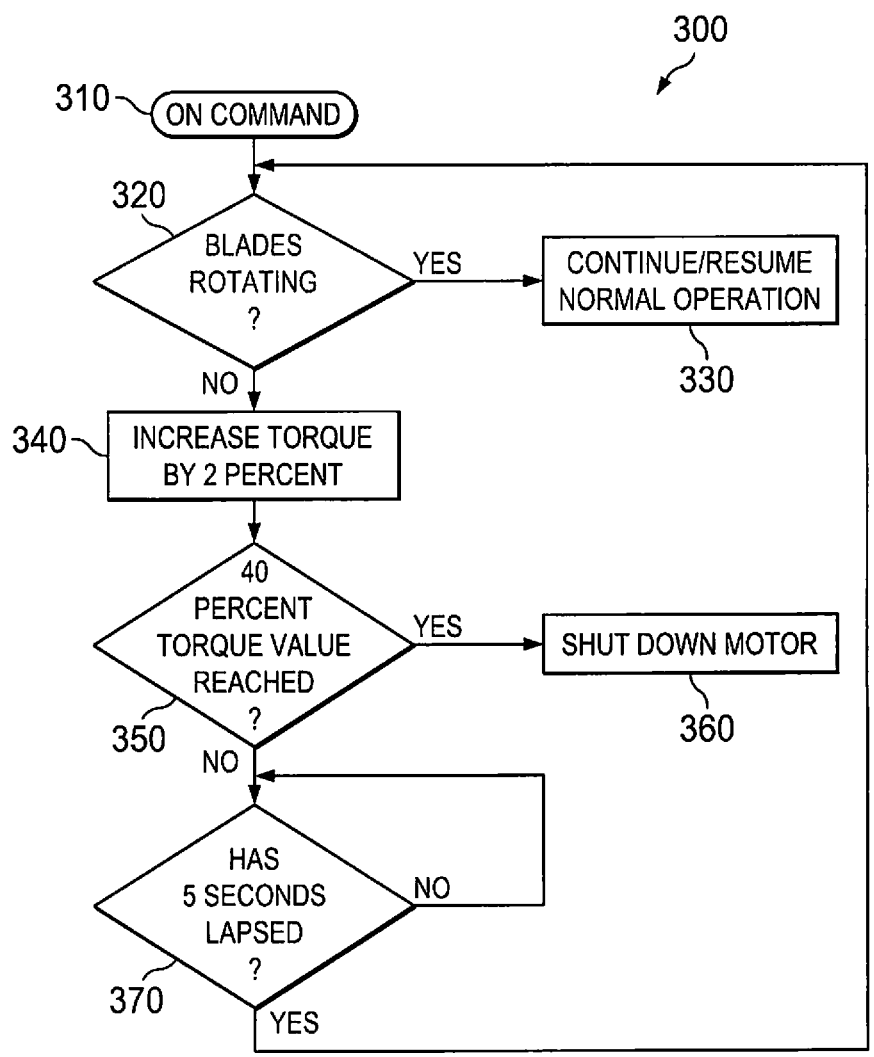
FIG. 3 is a flow diagram of a method of operating a fan motor of an air conditioning system according to one embodiment of the disclosure.

FIG. 3 presents a flow diagram of one embodiment of a method 300 of operating a controller configured to control a fan blade motor of the system 100 of FIG. 1 when blocked by an obstacle. This particular embodiment increases the torque of the motor by 2% every 5 seconds until either the fan blades become unblocked or 40% of the torque capacity of the motor 135 is reached. It should be understood, however, that the percentages and times between increases in the torque and the total torque capacity achieved may vary from one embodiment to another. The method 300 begins with a step 310, in which the motor 135 receives an on command from controller 130.

In a step 320, the rotation sensor signals the controller 130 or 155, depending on the embodiment, whether the fan blades of the compressor motor 135 are rotating. If rotation is determined, then the system 100 continues or resumes normal operation in step 330. However, if rotation is not sensed by the rotation sensor, the method 300 advances to step 340 in which the controller 130 or 155 causes the torque of the motor 135 to increase by 2%. The method then proceeds to a step 350 in which it is determined whether the increase in the torque has caused the value to reach 40% of the torque capacity of the motor 135. If yes, then the motor 135 shuts down operation in method step 360. If no, then the method proceeds to a step 370 in which it is determined whether 5 seconds has lapsed since the last increase in torque. If yes, then the method returns to step 320 to determine if the increase in torque freed the fan blades. If 5 seconds has not lapsed, the method loops back, as shown, until 5 seconds has lapsed. This process continues until either 40% of the motor's torque has been achieved or until the fan blades are unblocked, which ever occurs first.

Figure 4:
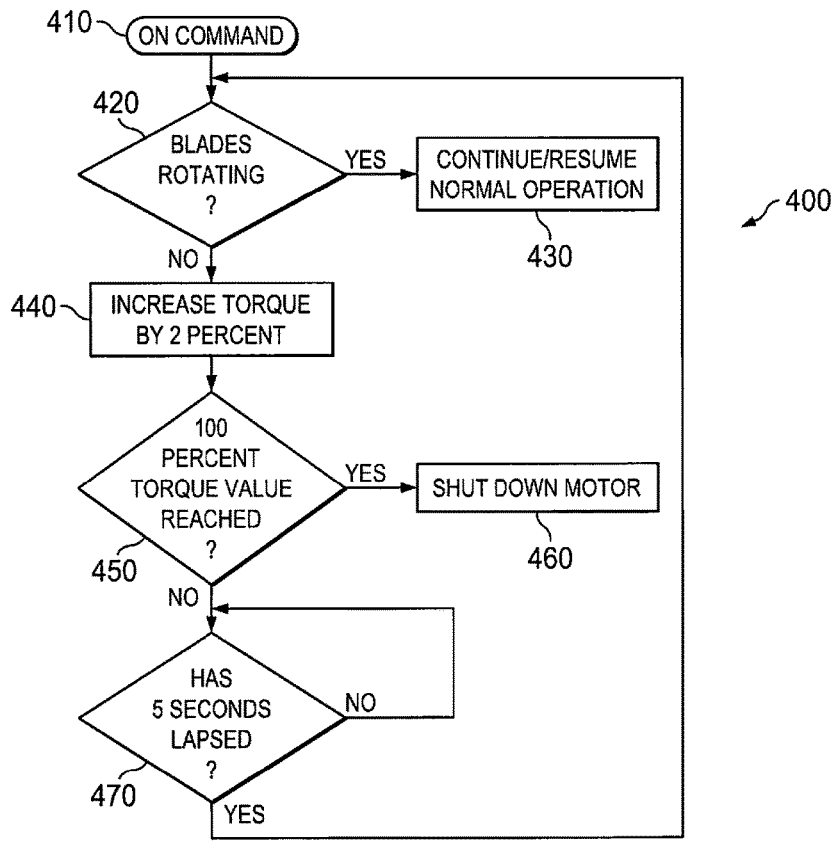
FIG. 4 is a flow diagram of another method embodiment of operating a fan motor of an air conditioning system according to another embodiment of the disclosure.

FIG. 4 presents a flow diagram of another embodiment of a method 400 of operating a controller configured to control a fan blade motor of the system 100 of FIG. 1 when blocked by an obstacle. This particular embodiment increases the torque of the motor by 2% every 5 seconds until either the fan blades become unblocked or 100% of the torque capacity of the motor 135 is reached. As with the previous method embodiment, it should be understood, that the percentages and times between increases in the torque and the total torque capacity achieved may vary from one embodiment to another. The method 400 begins with a step 410, in which the motor 135 receives an on command from controller 130.

In a step 420, the rotation sensor signals the controller 130 or 155, depending on the embodiment, whether the fan blades of the compressor motor 135 are rotating. If rotation is determined, then the system 100 continues or resumes normal operation in step 430. However, if rotation is not sensed by the rotation sensor, the method 400 advances to step 440 in which the controller 130 or 155 causes the torque of the motor 135 to increase by 2%. The method then proceeds to a step 450 in which it is determined whether the increase in the torque has caused the value to reach 100% of the torque capacity of the motor 135. If yes, then the motor 135 shuts down operation in method step 460. If no, then the method proceeds to a step 470 in which it is determined whether 5 seconds has lapsed since the last increase in torque. If yes, then the method returns to step 420 to determine if the increase in torque freed the fan blades. If 5 seconds has not lapsed, the method loops back, as shown, until 5 seconds has lapsed. This process continues until either 100% of the motor's torque has been achieved or until the fan blades are unblocked, which ever occurs first.

Figure 5:
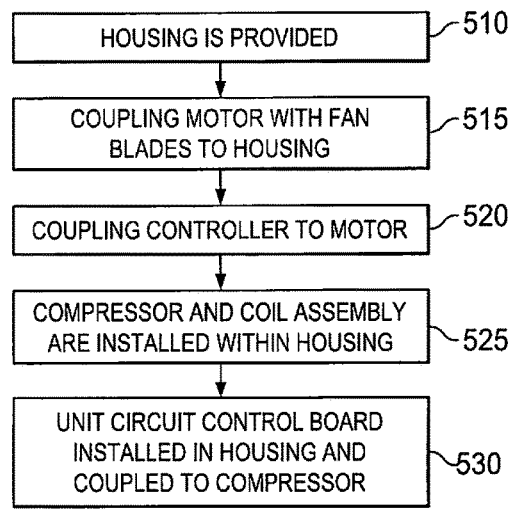
FIG. 5 illustrates a flow diagram of fabricating a portion of an air conditioning system in accordance with this disclosure.

Another aspect of this disclosure provides a method of manufacturing an air conditioning system, a flow diagram of which that is shown in FIG. 5. This method begins at step 510 in which a compressor housing is provided. As used herein, provided or providing includes those instances where the item is built by the assembling party or obtained from either an internal or external supplier. In step 515, a motor, which have fan blades attached to a rotary shaft extending from the motor is placed within and attached to the housing. As previously described, the motor has a rotation sensor associated with it and is configured to sense a rotation of said fan blades. The sensor may be of various design, including mechanical, electrical or optical. Those skilled in the art are familiar with such system. In step 520, a controller is coupled to the motor. Coupled refers to the controller being coupled to the motor by wires or being couplable to the motor by a wireless system, and may be located on or within the motor housing itself or be located in a separate location from the motor. The controller is configured to increase a torque of the motor when the rotation sensor indicates that the fan blades are not rotating after an on command signal is received by the motor. In another step 525, the compressor and coil assembly are installed within the housing, and in step 530, control circuitry boards are attached to the housing and coupled to the compressor. It should be understood that these steps need not be accomplished in the order set out above and the assembling of the unit may include a number of other conventional steps required to complete the manufacture of the unit.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An air conditioning system, comprising:
   a compressor housing;
   a motor having fan blades rotatably coupled to the motor and located within said compressor housing, said motor having a sensor operable to detect when the fan blades pass by the sensor; and
   a controller coupled to said motor and said sensor, said controller having programming circuitry comprising a program configured to increase a torque of said motor to overcome a physical blockage when said sensor fails to send a signal to the controller indicating that the fan blades have passed by said sensor a predetermined time after an on command signal is received by said motor, wherein once the fan blades pass the sensor the controller returns the air conditioning system to normal operation.

2. The system recited in claim 1, wherein the sensor comprises a mechanical sensor.

3. The system recited in claim 1, wherein the sensor comprises an electrical sensor.

4. The system recited in claim 1, wherein said controller is configured to increase said torque to a maximum torque and then shut down the motor if the fan blades do not pass the sensor.

5. The system recited in claim 1, wherein said controller is distally coupled to said motor.

6. The system recited in claim 5, wherein said controller is coupled to said motor by a wire extending from said controller to said motor.

7. The system recited in claim 5, wherein said controller includes a first wireless transmitter/receiver and said motor includes a second wireless transmitter/receiver and said controller is wirelessly couplable to said motor by way of said first and second wireless transmitters/receivers.

8. The system recited in claim 1, wherein said controller is configured to increase said torque to about 40% of a total torque capacity of said motor when a movement of said fan blades is not detected by said sensor after said motor receives said on command signal.

9. The system recited in claim 8, wherein said about 40% is achieved by said controller being configured to increase said torque of said motor by 2% every 5 seconds to until said about 40% torque capacity is achieved.

10. The system recited in claim 1, wherein said controller is configured to increase said torque until said fan blades pass the sensor.

11. A method of manufacturing an air conditioning system, comprising:
    providing a compressor housing;
    placing a motor having fan blades rotatably coupled to the motor within said compressor housing, said motor having a sensor operable to detect when the fan blades pass by the sensor; and
    coupling a controller to said motor and said sensor, said controller having programming circuitry comprising a program configured to increase a torque of said motor when said sensor fails to send a signal to the controller indicating that the fan blades have passed by said sensor a predetermined time after an on command signal is received by said motor, wherein once the fan blades pass by the sensor the controller returns the air conditioning system to normal operation.

12. The method recited in claim 11, wherein the sensor comprises a mechanical sensor.

13. The method recited in claim 11, wherein the sensor comprises an electrical sensor.

14. The method recited in claim 11, wherein the controller is configured to raise the torque to a maximum torque and if the fan blades do not pass by the sensor then the controller shuts down the motor.

15. The method recited in claim 11, wherein coupling said controller includes distally coupling said controller to said motor.

16. The method recited in claim 15, wherein distally coupling said controller includes coupling said controller to said motor by a wire extending from said controller to said motor.

17. The method recited in claim 15, wherein distally coupling said controller to said motor includes placing a first wireless transmitter/receiver on said controller and placing a second wireless transmitter/receiver on said motor such that said controller and said motor are wirelessly couplable to each other.

18. The method recited in claim 11, wherein said controller is configured to increase said torque to about 40% of a total torque capacity of said motor when a movement of said fan blades is not detected by said sensor after said motor receives said on command signal.

19. The method recited in claim 18, wherein said controller is configured to increase said torque by 2% every 5 seconds until said 40% torque is achieved.

20. The method recited in claim 11, wherein said controller is configured to increase said torque until said sensor senses a movement of said fan blades.

* * * * *